May 18, 1965  C. L. AUERNHEIMER  3,184,549
COUPLING CIRCUIT FOR A COMMUNICATION SYSTEM
Filed Feb. 2, 1961  2 Sheets-Sheet 1

CLARENCE L. AUERNHEIMER
INVENTOR
HUEBNER & WORREL
ATTORNEYS
BY Richard M. Worrel May 18, 1965  C. L. AUERNHEIMER  3,184,549
COUPLING CIRCUIT FOR A COMMUNICATION SYSTEM
Filed Feb. 2, 1961  2 Sheets-Sheet 2

CLARENCE L. AUERNHEIMER
INVENTOR
HUEBNER & WORREL
ATTORNEYS

United States Patent Office 3,184,549
Patented May 18, 1965

3,184,549
COUPLING CIRCUIT FOR A COMMUNICATION SYSTEM
Clarence L. Auernheimer, Fresno, Calif., assignor to A.V. Electronics, Inc., Fresno, Calif., a corporation of California
Filed Feb. 2, 1961, Ser. No. 86,656
8 Claims. (Cl. 179—1)

The present invention relates to a coupling circuit for a communication system and more particularly to a coupling circuit for an educational communication system which enables optimum communication between a master signal generator, a teacher's station, and a plurality of students' stations while avoiding interference between signals emanating from the generator and from the teacher's station and while affording isolation between the students' stations.

The subject invention is conveniently described in connection with the teaching of language in so-called language laboratories but is not to be limited to such. A brief description of one of these laboratories will facilitate an understanding of the present invention. Preferably such a laboratory includes a group of sound-proof rooms, herein referred to as students' stations, and a teacher's room or station. Usually, the teacher's station is equipped with a console providing a master signal generator and a master control panel. Typically, the master signal generator is a magnetic tape reproduction unit adapted to reproduce tapes on which are recorded specially prepared language courses. Each student's station is equipped with a microphone, an amplifier, and a set of earphones. In use, the teacher plays a selected tape which is transmitted to the students' stations. The students listen to the tape which may be provided with breaks during which the student repeat his interpretation of the recorded words or sentences into the microphone. The students' remarks or statements may be recorded on another portion of the tape and subsequently reviewed by the student and/or the teacher.

In order for such a teaching system to be of maximum effect, several features are necessary. The system must enable the teacher to listen to any one of the students in order to evaluate the students' responses. Further, the teacher and each student must be able to communicate so that the student can question the teacher and so that the teacher can criticize or comment on the work of the student. While the teacher is talking through the system to the student, the instruction tape must be cut out to avoid confusion between the teacher's voice and the recorded information on the tape. In addition, it is essential to avoid any substantial interference between student stations. That is, the desired communication between the teacher's station, the students' station, and the reproduction unit must be effected without electrically conducting the responses of any one student to the amplifiers of the other students. Stated otherwise, the students' stations must be virtually isolated from each other. Still further, the described interconnection of stations and reproduction unit must be accomplished with a minimum loss of power.

While prior art apparatus has been provided for carrying out the purposes of a language laboratory, such apparatus has not been entirely satisfactory insofar as the foregoing features are concerned. While isolation, interference, and power loss have been minimized, the known apparatus has been unduly complex in construction and operation end of relatively high cost.

Accordingly, it is an object of the present invention to provide a coupling circuit for an educational communication system, or the like, which enables optimum communication between a master signal generator, a teacher's station, and a plurality of student stations wherein interference is avoided between the student stations and between signals emanating from the generator and from the teacher's station while the teacher is communicating with one or more of the student stations.

Another object is substantially to prevent signals emanating from a student station in an educational communication system from being applied to the input of the amplifiers in the other student stations.

Another object is automatically to cut out the master signal generator whenever the teacher in an educational communication system is communicating with one of the student stations.

Another object is to couple the amplifiers and microphones in a plurality of student and teacher stations and the output of a master signal generator with a minimum loss of power.

Another object is to provide a coupling circuit of the nature described which is of simplified construction and which includes a minimum number of circuit components of minimum cost.

Another object is to provide apparatus for an educational communication system which is of relatively compact and lightweight construction.

Another object is to provide a coupling circuit in a system of the character described which enables individual communication between a teacher's station and any one of a large number of students' stations with a minimum amount of switching.

Another object is to provide a coupling circuit of the type described which is readily adapted for incorporation into existing educational communication systems.

These, together with other objects, will become more fully apparent upon reference to the following description and accompanying drawings.

Figure 1:
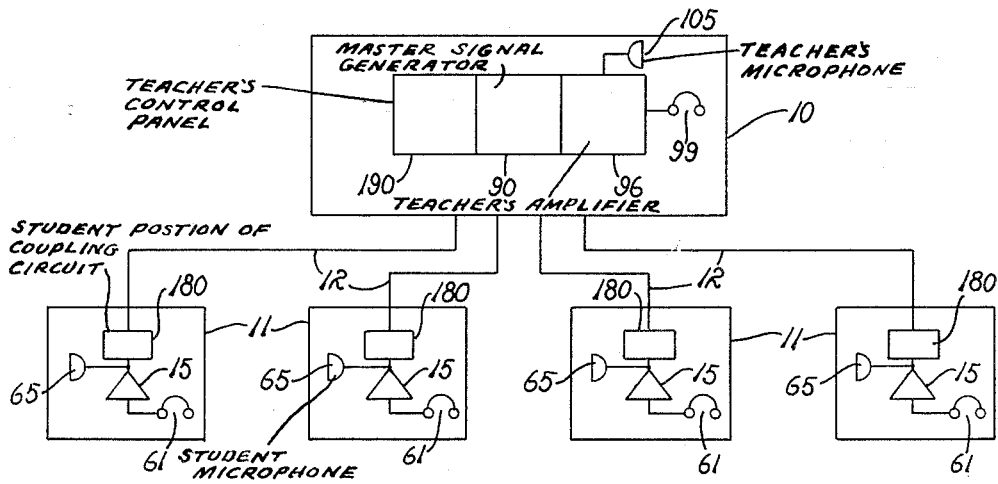
FIG. 1 is a diagrammatic view of a language laboratory including a coupling circuit embodying the principles of the present invention.

Referring more particularly to the drawings, a language laboratory of the type in which the subject invention is incorporated is generally illustrated in FIG. 1. This laboratory includes a teacher's station 10, a plurality of identical students' stations 11, and cables 12 providing electrical connection between the teacher's station and the students' stations.

Inasmuch as all of the students' stations 11 are identical, only one is described in detail. Therefore, each student's station includes a preferably transistorized, student amplifier generally indicated by the numeral 15 in FIGS. 1 and 2, in particular. The amplifier provides an input stage 16 including a transistor 17 having the characteristic emitter, collector, and base electrodes. A biasing resistor 18 in parallel with a by-pass condenser 19 is connected from the emitter electrode to ground 20. A load resistor 22 in series with a de-coupling resistor 23 connect the collector electrode to a source of direct current voltage, B+ at 25.

The amplifier 15 further provides a D.C. voltage-isolating, input condenser 26 having one plate connected to the base electrode and an opposite plate connected to an input terminal 27 by means of a shielded lead 28. Also, a de-coupling condenser 30 is connected from between the load and de-coupling resistors 22 and 23 to ground 20. The impedance between the input terminal 27 and ground is low, as more specifically discussed hereinafter.

The amplifier 15 provides an intermediate stage 35 including a transistor 36, a gain control rheostat 37 in series with a gain control resistance 38, a by-pass condenser 39 across said rheostat and resistance, a D.C. voltage feedback resistance 40 interconnecting the emitter electrode of the transistor 36 and the base electrode of the input transistor 17, a load resistor 41 interconnecting the collector electrode of the intermediate transistor and the voltage source 25, and a coupling lead 43 interconnecting the collector electrode of the input transistor and the base electrode of the intermediate transistor. For improving the high frequency response of the amplifier, a series combination of a feedback condenser 45 and a resistor 46 interconnect the collector electrode of the intermediate transistor and the emitter electrode of the input transistor.

An output stage 50 of the amplifier 15 includes a transistor 51, a biasing resistor 52, a by-pass condenser 53, a load resistor 54, a coupling lead 56 between the intermediate and output transistors, and an output condenser 58 interconnecting the collector electrode of the output transistor and a phone jack 59. A headset 61 is also provided at each student's station 11, and is connected to the phone jack for enabling the student to listen to the output of the amplifier.

Figure 4:
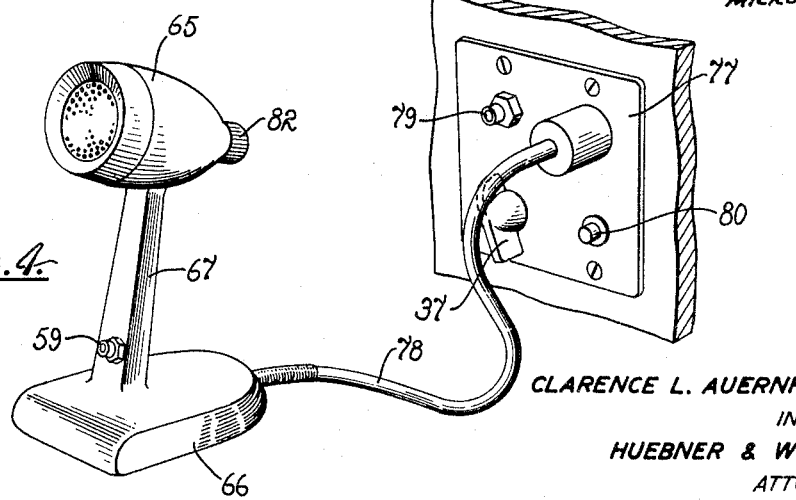
FIG. 4 is a perspective view of certain equipment employed in the language laboratory of FIG. 1.

A low impedance microphone 65, illustrated in perspective in FIG. 4, is provided at each student's station 11. The microphone includes a base 66 in which is compactly mounted most of the above described components of the amplifier 15. The microphone also has an upstanding stand 67 in which is mounted the phone jack 59. In this manner, when the headset 61 is connected into the phone jack 59, the headset and microphone are in closely adjacent relation to each other and facilitate use thereof by the student.

Figure 2:
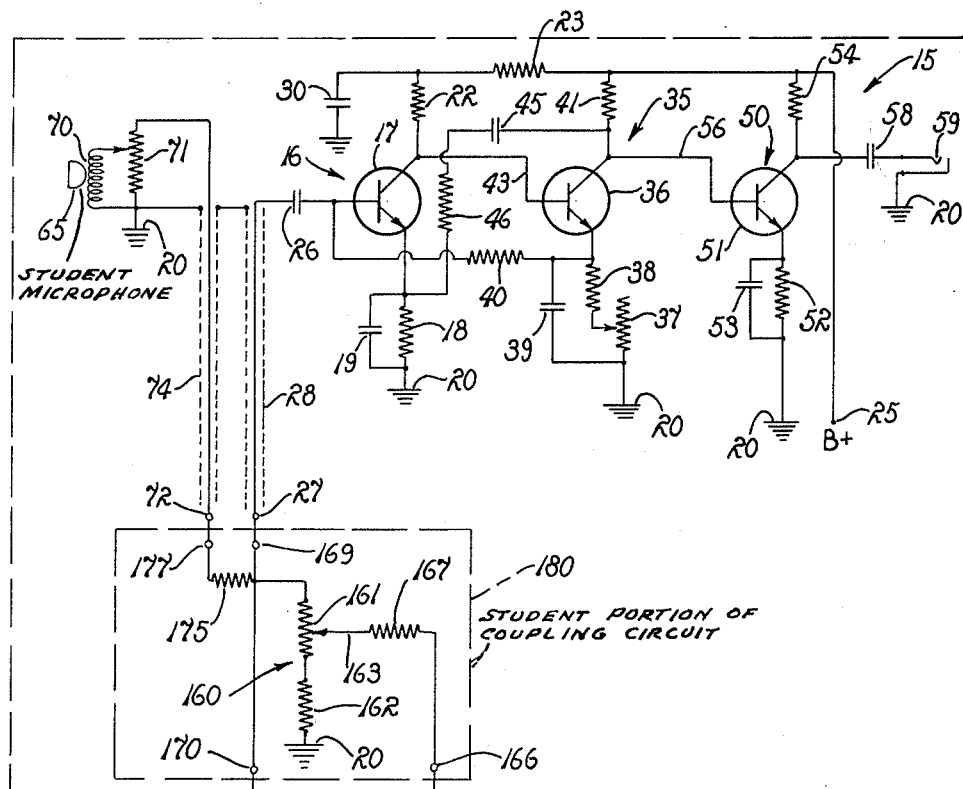
FIG. 2 is an electrical schematic of portions of the language laboratory illustrated in FIG. 1 and particularly illustrating the coupling circuit of the present invention.
Figure 2:
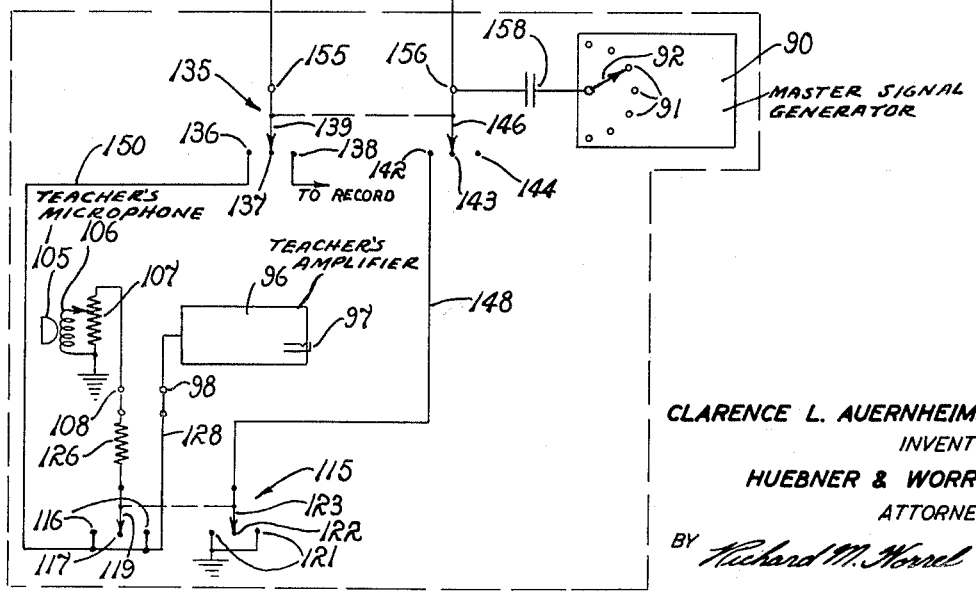

With particular reference to FIG. 2, the microphone 65 includes a voice coil 70 connected in parallel with an adjustable load resistor 71. One end of the load resistor is grounded while the other end is connected to a microphone terminal 72 by means of a shielded lead 74. Once again referring to FIG. 4, a mounting plate 77 is also provided in each student's station 11. The gain control rheostat 37 of the amplifier 15 is borne by the mounting plate 77. A conductor 78 extends from the base 66 of the microphone to the mounting plate, and suitable connections, not shown, are made to the amplifier components in the base and to the rheostat on the plate, in the manner described above and shown in FIG. 2. The microphone and input terminals 72 and 27 are provided on the back of the mounting plate in a manner not shown. An additional phone jack 79 and a call button 80 are supported in the mounting plate but require no further detailed description at this point. It is also to be noted that the load resistor 71 is adjusted by means of a knob 82 borne by the microphone.

Figure 3:
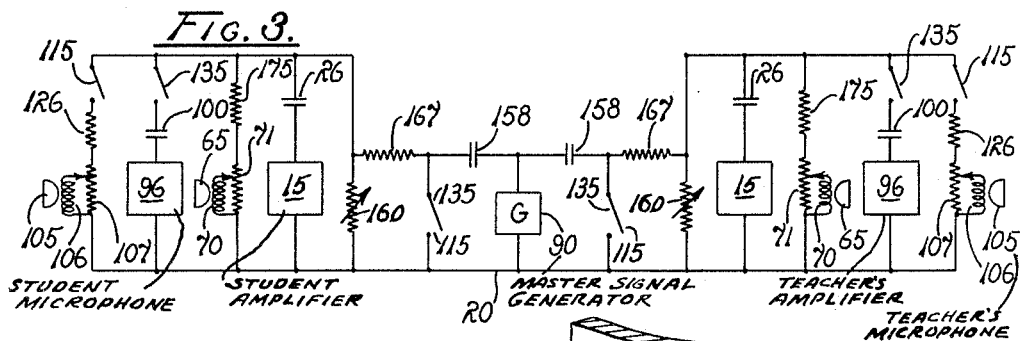
FIG. 3 is a simplified schematic circuit further illustrating the principles of the present invention.

With reference to the teacher's station 10, a master signal generator 90 is generally indicated in FIGS. 1 and 2; this generator is also identified by the letter "G" in FIG. 3. While this generator is ordinarily a magnetic tape reproduction unit, it is to be understood that it may be any means for providing an informational or instructional signal. The generator has an output 91 which presents a medium impedance higher than the relatively low impedance of the input to the amplifier 15, as developed between the input terminal 27 and ground 20, or the low impedance parallel combination of the voice coil 70 and load resistor 71. A switch 92 is provided in the output of the signal generator for selecting various magnetic tapes or signals to be transmitted to the students' stations 11.

A teacher's amplifier 96 is provided at the teacher's station 10. This amplifier is simply represented by a block diagram inasmuch as it is of the same construction as the student's amplifier 15 described above. However, the output jack 97 and input terminal 98 of the teacher's amplifier are specifically illustrated. A headset 99 is provided at the teacher's station for connection to the output jack 97 thereby enabling the teacher to listen to the output of the teacher's amplifier.

Also, the teacher's station 10 includes a microphone 105 having a voice coil 106, an adjustable load resistor 107, and a terminal 108, all in the same manner as the student's microphone 65.

The coupling circuit of the present invention is best illustrated in FIG. 2. This circuit includes a double pole, "teacher talk" switch 115 providing "talk" contacts 116, an "off" contact 117, and a "talk" switch blade 119 manually movable between the "talk" and "off" contacts. The switch 115 also includes ground contacts 121, an "off" contact 122 between said ground contacts, and a muting switch blade 123 movable from the "off" contact to either of the ground contacts. The switch blades 119 and 123 are mechanically linked for simultaneous movement.

As illustrated in FIG. 2, a microphone coupling resistor 126 connects the "talk" switch blade 119 to one end of the load resistor 107 of the teacher microphone 105; this load resistor has an opposite end which is connected to ground 20. Further, a lead 128 connects the "talk" contacts 116 to the input terminal 98 of the teacher amplifier 96.

The coupling circuit also includes a double pole communicate switch 135 including "communicate" and "off" contacts 136 and 137, a "record" contact 138, and a switch control blade 139 movable from the off contact to either of the communicate or record contacts. The communicate switch further provides muting, off, and neutral contacts 142, 143 and 144 selectively engaged by a muting control blade 146 which is mechanically linked to the switch control blade 139 for concurrent movement therewith. A muting lead 148 interconnects the muting contact 142 and the muting switch blade 123. A communicating lead 150 interconnects the communicate contact 136 and the talk contacts 116. The switch and muting control blades 139 and 146 are individually connected to terminals 155 and 156. An isolation capacitor 158 interconnects the muting control blade and the output switch 92 of the signal generator 90.

The coupling circuit provided at each student's station 11 includes a voltage developing resistance 160 a relatively high resistance potentiometer 161 and a fixed resistor 162 connected in series, with the fixed resistor being grounded. The potentiometer includes an adjusting arm 163 which is connected to a generator terminal 166 through a resistor 167 of relatively high resistance. It is to be noted that the terminal 166 is connected to the terminal 156 at the teacher's station 10 through the cable 12. The potentiometer is also connected to a student amplifier terminal 169, the latter being further connected to a "communicate" terminal 170. The communicate terminal is connected to the terminal 155 at the teacher's station through the cable 12. A microphone coupling resistor 175 is connected to the student amplifier terminal and also to a student microphone terminal 177. The terminals 169 and 177 are respectively connected to the terminals 27 and 72 at their respective student stations.

That portion of the coupling circuit which is enclosed within the dashed lines 180 in FIG. 2 is mounted on the back of the plate 77 with the connections between the terminals 169, 177, 27, and 72 being also established back of the plate. The remaining portions of the coupling circuit, namely, the talk and communicate switches 115 and 135, the coupling resistor 126, the isolation capacitor 158, and the appropriate electrical connections are at the teacher's station 10, as is believed understood.

For the convenience of readily constructing an operative embodiment of the subject invention, certain components employed in a commercial embodiment of the subject invention are specified below. It is to be understood, however, that the invention is not limited to the specified values or types of components and that other values and types will be readily apparent to those skilled in the art.

| | Ohms |
|---|---|
| Resistor 18 | 47 |
| Resistor 22 | 12,000 |
| Resistor 23 | 3,300 |
| Resistor 37 | 500 |
| Resistor 38 | 560 |
| Resistor 40 | 33,000 |
| Resistor 41 | 12,000 |
| Resistor 46 | 22,000 |
| Resistor 52 | 680 |
| Resistor 54 | 1,200 |
| Voice coil resistance 70 | 10 |
| Resistor 71 | 20 |
| Resistor 126 | 4.7 |
| Potentiometer 161 | 10,000 |
| Resistor 162 | 220 |
| Resistor 167 | 3,300 |
| Resistor 175 | 4.7 |

| | Microfarads |
|---|---|
| Condenser 19 | 10 |
| Condenser 30 | 10 |
| Condenser 26 | 10 |
| Condenser 29 | 10 |
| Condenser 45 | 0.02 |
| Condenser 53 | 0.47 |
| Condenser 58 | 10 |
| Condenser 158 | 0.01 |

Transistors 17 and 36 _____ 2N213
Transistor 51 _____ 2N35
Input impedance between input terminal 27 and ground 20 of each amplifier 15, or 96, approximately 10 ohms.

With reference to FIG. 3, it is evident that the parallel combination of each load resistor 71 and corrresponding coil 70 in series with the coupling resistor 175 are in parallel with the input of their respective amplifier 15. The input impedance of the amplifier is substantially equal to the impedance across the coupling resistor 175 and the load resistor 71, so that substantial impedance match is effected. Likewise, when either or both of the teacher's microphone 105 or amplifier 96 are connected into the circuit by switches 115 and 135, they are in parallel with the students' amplifier and microphone. Once again, because of the impedance values selected, the impedances are substantially matched. It is to be noted that a very high impedance is presented by the coupling circuit between the terminal 166 and ground 20. This high impedance is determined by the low capacity of the capacitor 158 and the relatively high resistance of the resistor 167. However, the coupling circuit has a relatively low impedance from the amplifier terminal 169 to ground, as determined by the relatively low impedance of the coupling resistor 175 in series with the parallel combination of the voice coil 70 and load resistor 71.

In considering FIG. 3, it is to be emphasized that this is a diagrammatic circuit. For example, two teachers' amplifiers 96 and microphones 105 are shown individually connected in the circuit across the students' microphones 65 and amplifiers 16. This is shown in this manner to afford a better understanding of the circuit relationships. In the actual system, however, only one teacher's microphone and amplifier are employed and these are applied across selected students' amplifiers by appropriate switches, not shown. In addition, the resistance numbered 160 in FIG. 3 actually includes resistance 161 and resistor 162 in FIG. 2. Further, the shorting of the generator signal is actually accomplished by two switches 115 and 135, as illustrated in FIG. 2. For the purpose of simplicity, only a single switch jointly numbered 115 and 135 is provided in FIG. 3. Since switch 115 also functions in another circuit, the number 115 is applied to the switch in series with the teacher's microphone in FIG. 3. This is also true of the switch numbered 135 in series with the teacher's amplifier in FIG. 3.

*Operations*

The operation of the described embodiment of the subject invention is believed to be readily apparent and if briefly summarized at this point. Assuming that the language laboratory of the subject invention is employed for the purpose of teaching a foreign language, students are individually assigned to the students' stations 11 and a teacher is located in the teacher's station 10.

The students, not shown, wear their respective headsets 61 in the usual manner. The teacher energizes the signal generator 90 by a suitable switch, not shown. In actuality, this may involve connecting a magnetic tape into the apparatus 90 so that the tape is reproduced and the reproduction transmitted through the switch 92 to the students' stations 11. For example, the tape may provide a lesson in French. The signals from the generator are conducted through the capacitor 158 and the resistor 167 and develop a signal voltage across the impedance 160 which is applied to the input of the students' amplifier 15. These signals are amplified and reproduced in the students' headset 61.

As is well-known in the art, blanks or breaks are provided in the instructional tape during which time the student repeats the words which he has heard over his headset thereby to gain practice in speaking the language being taught. If the teacher, not shown, desires to listen to the students' responses, the teacher moves the switch control blade 139 into engagement with the communicate contact 136 thereby placing the teacher's amplifier 96 in parallel with the students' amplifier 15. The teacher thus listens to the same signals that the student does including the generated signals as well as the students' responses. Because of the described impedance matching, the connection of the teacher's amplifier in parallel with the students' amplifier and microphone 65 does not lower the signal level to any noticeable extent so that the student is usually unaware that the teacher is listening.

The teacher may wish to communicate with the student either because the student has solicited the teacher's aid or because the teacher wishes to criticize the work of the student. If so, the teacher moves the switch blade 119 into engagement with the talk contact 116 thereby placing the teacher's microphone 105 in parallel with the student's amplifier 15, the student's microphone 65, and the teacher's amplifier 96. Once again, there is no appreciable drop in the signal level incident to this additional connection in the circuit because of the matched impedances. However, movement of the switch blade into engagement with the talk contact also moves the switch blade 123 into engagement with one of the ground contacts 121. Since the muting control blade 146 is already in engagement with the muting contact 142, the output of the signal generator 90 to the particular student's station is shorted to ground. This is perhaps best illustrated in FIG. 3 where it is noted that a short circuit is thereby provided across the isolation resistor 167 and the voltage developing resistance 160. Parenthetically, it is significant that this does not short out the generator, per se, but simply the portion of the generated signal which is applied to the particular student's amplifier. The isolation capacitor 158 is of such high reactance that shorting out the generator is precluded. The practical effect of this is that the generator signal to any one of the students' amplifiers can be shorted to ground without shorting out, or otherwise effecting, the application of the generator signal to the amplifiers of the other students' stations. Also, shorting out of the generator signal to any one student's station does not affect the students' or teacher's signals as applied across the developing resistance 160 and thus the inputs of the amplifiers. This is best understood by reference to FIG. 3 where it is evident that the isolation resistor is connected directly in parallel with the developing resistance when the muting blade engages the muting contact; the relatively high value of the resistor does not appreciably change the effective resistance of the voltage developing resistance.

With the switches 115 and 135 in the closed positions described in the preceding paragraph, the teacher communicates with one or more students. When the conversation is completed, the teacher moves the switch blade 119 into engagement with the off contact 117. Once again, the generator signal is applied to the student's amplifier 15, and the student continues to listen and respond, as before. It is to be noted that the button 80 on the mounting plate 77 is provided for gaining attention of the teacher. That is, the teacher's control panel 190 includes a light, not shown, which is energized by pressing the button all in a manner not shown but believed understood by those skilled in the art. When such light flashes, the teacher responds by closing the talk switch 115 in the manner described above.

It is also significant to emphasize that the coupling circuit, and particularly the isolation capacitor 153 and resistor 167, at each students' station 11 effectively isolates each students' station from every other students' station. This is best understood by reference to FIG. 3. Because of the relatively high impedance of the series combination of the isolation capacitor and resistor, appreciably all of the signal developed by each students' microphone is absorbed by such high impedance. That is, virtually none of the student's signal is developed across the generator 90. Thus, a student's voice is not transmitted beyond its respective isolation capacitor and cannot be transmitted to any of the other student amplifiers 15. The coupling circuit, and particularly the isolation capacitor and resistor, has the additional function of attenuating the master signal for application across the input of the amplifiers 15 or 96. The amount of attenuation is such that the amplitude of the master signal, as applied to the amplifier inputs, is substantially equal to the amplitude of the students' or teacher's signals as applied to the amplifiers. The net result is that all of the signals undergo substantially the same amplification so that the amplitudes in the outputs of the amplifiers are substantially the same. This minimzes attention to the gain control rheostat 37 when the different signals are being listened to.

From the foregoing, it is evident that a coupling circuit especially adapted for use in an educational communication system has been provided. The circuit is advantageous in providing an impedance match between the various components of the system, in isolating the students' stations from each other, and in avoiding interference between the master informational signal and the teacher's orally communicated instructions. The subject coupling circuit provides such advantages in an extremely simple and economical manner and in the use of a minimum number of lightweight and compact components.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. In a communication system, a source of master signals; a source of responsive signals; an amplifier having an input and an output; a voltage developing resistance; means connecting the responsive signal source and said voltage developing resistance in parallel with the input of the amplifier in substantially impedance matched relationship to each other; and impedance means connected in series circuit with the master source and said voltage developing resistance whereby that portion of the master signal which is developed across said developing resistance is substantially equal to the responsive signal dropped across said developing resistance so that said master and responsive signals are of substantially equal amplitude at the output of the amplifier, said impedance means including a common connection directly interconnecting the master source and said developing resistance, and a capacitor and a resistor connected in series between said master source and the voltage developing resistance, said capacitor and resistor being respectively of relatively high reactance and resistance, said impedance means also including shorting means connected from said common connection to a point between the capacitor and the resistor for shorting out said portion of the master signal applied to said developing resistance, said resistor being directly in parallel with said developing resistance when said master singal is shorted thereby to maintain development of said responsive signal across said developing resistance.

2. In an educational communication system including a plurality of student stations, and master signal generator having a predetermined medium output impedance, each of said stations including a student amplifier having an input providing a substantially uniform low impedance and a microphone having an output of low impedance; a coupling circuit comprising resistance means individually connecting the microphone outputs to the inputs of their respecttive amplifiers in substantially impedance matched relationship; high impedance resistance-capacitance means individually interconnecting the output of the generator and the inputs of the amplifiers in substantially impedance means isolating the stations from each other to minimize transmission of student signals from one student station to another; and means individually connected to the high impedance means and to the generator for shorting out the signal applied to selected student amplifiers without affecting application of the generator signal to the other amplifiers.

3. In an educational communication system including a plurality of student stations, and master signal generator having a predetermined medium output impedance, each of said stations including a student amplifier having an input providing a substantially uniform low impedance and a microphone having an output of low impedance; a coupling circuit comprising resistance means individually connecting the microphone outputs to the inputs of their respective amplifiers in substantially impedance matched relationship; high impedance resistance-capacitance means individually interconnecting the output of the generator and the inputs of the amplifiers in substantially impedance matched relationship, said high impedance means isolating the stations from each other to minimize transmission of student signals from one student station to another; and a teacher station providing a teacher amplifier having an input presenting an impedance substantially equal to the input impedance of the respective student amplifiers, said coupling circuit further comprising primary switching means having a closed position individually connecting the input of the teacher amplifier in parallel with the inputs of the student amplifiers.

4. The communication system of claim 3 wherein the teacher station also includes a teacher microphone having an output of substantially the same impedance as the outputs of the student microphones, and wherein said coupling circuit also comprises resistance means connected in series circuit with the output of the teacher microphone, and secondary switching means connected to the resistance means in the teacher station having a closed position individually connecting the output of the teacher microphone in parallel with the student microphones across the inputs of the teacher amplifier and the amplifiers of the corresponding student station, and an open position disconnecting the output of the teacher microphone from the student microphones.

5. The communication system of claim 4 wherein said secondary switching means includes means individually connected to said high impedance means and to the generator for shorting out the master signal applied to the student amplifier to which the output of the teacher microphone is connected in parallel by said secondary switch means without affecting application of the generator signal to the other student amplifier.

6. In an educational communication system including a pair of student stations each including a student amplifier having an input providing a relatively low impedance and a microphone having a relatively low output load resistance across which microphone signals are developed, and a master signal generator having an output providing a medium impedance relatively higher than the input impedances of the amplifiers; an isolating and impedance matching, coupling circuit comprising relatively low coupling resistances individually connected in series with the microphone load resistances whereby the total resistance of each coupling and load resistance is substantially equal to the input impedance of the amplifiers, conducting means individually connecting the serially connected load and coupling resistances in parallel with the inputs of their corresponding amplifiers, relatively high voltage developing resistances individually connected in parallel with the inputs of the amplifiers, capacitors of relatively high reactance, and circuit means individually connecting the generator in series circuit with the capacitors and the voltage developing resistances whereby the capacitors are individually positioned in their respective circuit means between the generator and the inputs of their corresponding amplifiers so that the generator signals are transmitted to both of the student amplifiers while signals developed in each of the microphone load resistance are substantially completely absorbed by their respective capacitors and thereby isolated from the other student station.

7. The system of claim 6 including a switch means individually connected in parallel with the voltage developing resistances having a closed position shorting its corresponding voltage developing resistance for precluding transmission of the generator signals to the corresponding student station, said capacitors being positioned in their respective circuit means between said switch means and the generator to preclude shorting of the generator when said voltage developing resistances are shorted.

8. In a transistorized amplifier, input, output and intermediate stages each having a transistor providing emitter, collector, and base electrodes; a ground connection; a source of D.C. voltage; biasing means individually connected between the emitter electrodes of the input and output transistors and said ground connection; an adjustable gain control rheostat connected between the emitter electrode of the intermediate transistor and ground; a bypass condenser connected in parallel with the rheostat for reducing regenerative feedback; conductors individually directly coupling the collector electrodes of the input and intermediate transistors to the base electrodes of the intermediate and output transistors, respectively; load resistors individually interconnecting the collector electrodes of said transistors and said voltage source, the load resistor for the input stage being selected for average gain in amplification through the input stage, the load resistor for the intermediate stage being selected for optimum gain in said intermediate stage, and the load resistor for the output stage being selected for linear operation of said output stage; a decoupling resistor connected in series from the load resistor of the input stage to said voltage source; a decoupling condenser connected from between said decoupling resistor and the load resistor for the input stage to the ground connection; a resistor directly interconnecting the emitter electrode of the intermediate transistor and the base electrode of the input transistor for providing D.C. voltage feedback; and a serially connected condenser and resistance interconnecting the collector electrode of the intermediate transistor and the emitter electrode of the input transistor for providing A.C. signal feedback to improve the high frequency response of the amplifier.

References Cited by the Examiner
UNITED STATES PATENTS

| 2,664,649 | 1/54 | Howell et al. | 35—35 |
| 2,864,903 | 12/58 | Becking et al. | 330—29 |
| 2,898,410 | 8/59 | Brooks | 330—120 |

OTHER REFERENCES

R.C.A.: "Language Lab. Systems," Installation Manual, June 1959, pages 1–27 relied on.

ROBERT H. ROSE, *Primary Examiner.*

GEORGE HYMAN, Jr., THOMAS B. HABECKER,
*Examiners.*